US012750438B2

(12) United States Patent
Jung et al.

(10) Patent No.: US 12,750,438 B2
(45) Date of Patent: Sep. 29, 2026

(54) MOBILE TERMINAL

(71) Applicant: LG ELECTRONICS INC., Seoul (KR)

(72) Inventors: Chalkee Jung, Seoul (KR); Inseok Yoo, Seoul (KR); Eujin Kim, Seoul (KR); Dongup Seo, Seoul (KR); Youngdo Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 487 days.

(21) Appl. No.: 18/038,310

(22) PCT Filed: Dec. 7, 2020

(86) PCT No.: PCT/KR2020/017724

§ 371 (c)(1),
(2) Date: May 23, 2023

(87) PCT Pub. No.: WO2022/124425

PCT Pub. Date: Jun. 16, 2022

(65) Prior Publication Data

US 2023/0421682 A1 Dec. 28, 2023

(51) Int. Cl.
*H04M 1/02* (2006.01)
*H04W 88/02* (2009.01)

(52) U.S. Cl.
CPC ......... *H04M 1/0283* (2013.01); *H04M 1/022* (2013.01); *H04M 1/0268* (2013.01); *H04M 2201/38* (2013.01); *H04W 88/02* (2013.01)

(58) Field of Classification Search
None
See application file for complete search history.

(56) References Cited

U.S. PATENT DOCUMENTS 10,838,458 B1 11/2020 Park et al.
2016/0116944 A1* 4/2016 Lee ........................ G06F 1/1681 361/679.26
2016/0295709 A1* 10/2016 Ahn ...................... H04M 1/022
(Continued)

FOREIGN PATENT DOCUMENTS

CN 208421694 U 1/2019
CN 109979328 A 7/2019
(Continued)

*Primary Examiner* — San Htun
(74) *Attorney, Agent, or Firm* — Birch, Stewart, Kolasch & Birch, LLP

(57) ABSTRACT

A mobile terminal is disclosed. The mobile terminal according to an embodiment of the present invention comprises a hinge assembly. The hinge assembly comprises: a pair of body rotation bodies which are arranged to be spaced apart from each other in the widthwise direction of a first body and a second body; a support bridge which is arranged between the pair of body rotation bodies and connects the body rotation bodies to each other; and a display support which is arranged to overlap with the support bridge in the widthwise direction of the first body and the second body and is formed to be movable by being linked to the movement of the support bridge, wherein the display support is, in a first state, arranged to support a flexible display and, in a second state, moves to be spaced apart from the flexible display.

7 Claims, 8 Drawing Sheets

(56) References Cited

U.S. PATENT DOCUMENTS

| | | | | |
|---|---|---|---|---|
| 2018/0110139 | A1* | 4/2018 | Seo | E05D 1/04 |
| 2018/0324964 | A1* | 11/2018 | Yoo | G06F 1/1652 |
| 2019/0166703 | A1* | 5/2019 | Kim | G06F 1/1641 |
| 2019/0320048 | A1* | 10/2019 | Yang | G06F 1/1652 |
| 2020/0103941 | A1* | 4/2020 | Lin | G06F 1/1652 |
| 2020/0192432 | A1* | 6/2020 | Yee | G06F 1/1641 |
| 2021/0026410 | A1* | 1/2021 | Park | G06F 1/1641 |

FOREIGN PATENT DOCUMENTS

| | | | |
|---|---|---|---|
| KR | 10-2015-0142290 | A | 12/2015 |
| KR | 10-2020-0118786 | A | 10/2020 |

* cited by examiner

MOBILE TERMINAL

CROSS REFERENCE TO RELATED APPLICATIONS

This application is a National Stage of PCT International Application No. PCT/KR2020/017724, filed on Dec. 7, 2020, which is hereby expressly incorporated by reference into the present application.

TECHNICAL FIELD

The present disclosure relates to a mobile terminal including a side decoration capable of supporting a flexible display between a first body and a second body of a foldable mobile terminal.

BACKGROUND ART

Terminals may be divided into mobile/portable terminals and stationary terminals according to mobility. Also, the mobile terminals may be classified into handheld types and vehicle mount types according to whether or not a user can directly carry.

Functions of mobile terminals have been diversified. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

However, in the case of a foldable mobile terminal, there is an increasing need for a side decoration of a mobile terminal that can cover a gap between a display and bodies in an unfolded state or flexibly move according to folding of different bodies in a folded state. In particular, when assembling such a side decoration to a mobile terminal in an unfolded state, various problems have arisen in which the display may be damaged.

DISCLOSURE OF INVENTION

Technical Problem

The present disclosure is directed to solving the above-mentioned problems and other drawbacks. Another aspect of the present disclosure is to provide a mobile terminal including a side decoration capable of defining appearance of one side of the mobile terminal while supporting a display of the mobile terminal.

Still another aspect of the present disclosure is to provide a mobile terminal to which a side decoration can be assembled more easily.

Solution to Problem

To achieve those aspects and other advantages according to the present disclosure, there is provided a mobile terminal that may include a first body, a second body configured to be rotatable relative to the first body, a flexible display continuously disposed on the first body and the second body, and a side decoration disposed between the first body and the second body and having at least a portion overlapping the flexible display, wherein the first body and the second body may be switched into a first state to be disposed side by side and a second state to face each other, and a side surface of the side decoration is formed on the same line as outer side surfaces of the first body and the second body.

In one embodiment disclosed herein, the side decoration may include a side part defining a portion of a side surface, together with the first body and the second body, and a protrusion protruding toward the flexible display from an upper end of the side part.

In one embodiment disclosed herein, the protrusion may be disposed to overlap one area of the flexible display in the first state, and disposed to be spaced apart from the flexible display in the second state.

In one embodiment disclosed herein, the first body and the second body may include a first concave groove and a second concave groove, respectively, into which the side part of the side decoration is inserted.

In one embodiment disclosed herein, the side decoration may further include coupling protrusions protruding toward the first body and the second body, respectively, from an inside of the side part to be coupled to the first body and the second body, and the first body and the second body may include coupling grooves, respectively, formed concavely so that the coupling protrusions are inserted therein.

In one embodiment disclosed herein, the side part of the side decoration may include fastening holes into which coupling members are inserted, and the first body and the second body may include coupling grooves, respectively, into which the coupling members are inserted.

In one embodiment disclosed herein, the side decoration may be inserted into the first body and the second body in the second state.

In one embodiment disclosed herein, top surfaces of the first body and the second body and a top surface of the side decoration may have the same height.

In one embodiment disclosed herein, the mobile terminal may further include a hinge assembly connected to the first body and the second body and configured to switch the first body and the second body into the first state and the second state, the hinge assembly may include a hinge decoration obscured by the first body and the second body in the first state and visible to outside in the second state, and the protrusion may be inserted into the hinge decoration.

Advantageous Effects of Invention

As such, in a mobile terminal according to one embodiment of the present disclosure, since a side decoration defines appearance of a side surface of the mobile terminal, external impact that may be applied to the mobile terminal when the mobile terminal is dropped is absorbed by the side decoration, thereby reducing the fear of deformation.

In addition, according to one embodiment of the present disclosure, since the side decoration is coupled to a first body and a second body, the need to secure rigidity due to drop impact is decreased, thereby reducing a size of a bezel.

The mobile terminal according to an embodiment of the present disclosure may be coupled to a hinge case by screws in a lateral direction. Therefore, there is an advantage of reducing distortion of an outer case including the first body and the second body in three axial (X-axial, Y-axial, and Z-axial) directions due to external impact.

Furthermore, in the mobile terminal according to one embodiment of the present disclosure, when the side decoration is assembled with the hinge case, coupling protrusions of the side decoration may be fitted to a slot guide of body rotation bodies, thereby reinforcing rigidity of the slot guide itself. Accordingly, there is an effect of reducing movement that may occur in the slot guide when the first body and the second body are switched to a first state and a second state.

MODE FOR THE INVENTION

Hereinafter, description will be given in more detail of a mobile terminal according to the present disclosure, with reference to the accompanying drawings.

For the sake of brief description with reference to the drawings, the same or equivalent components will be provided with the same reference numbers, and description thereof will not be repeated. A singular representation used herein may include a plural representation unless it represents a definitely different meaning from the context. In general, a suffix such as "module" and "unit" may be used to refer to elements or components. Use of such a suffix herein is merely intended to facilitate description of the specification, and the suffix itself is not intended to give any special meaning or function.

Figure 1:
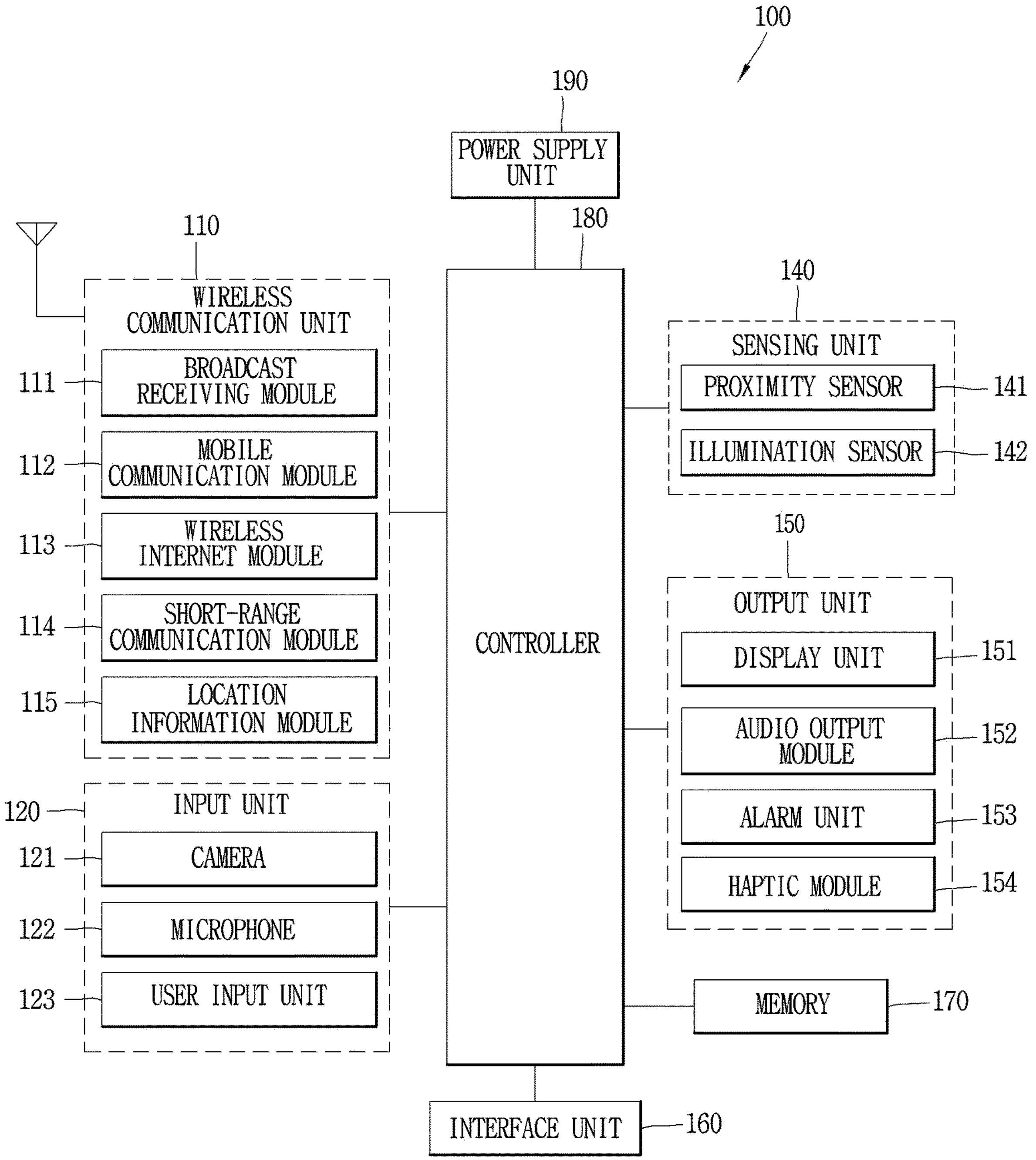
FIG. 1 is a block diagram of a mobile terminal in accordance with one embodiment of the present disclosure.
Figure 3:
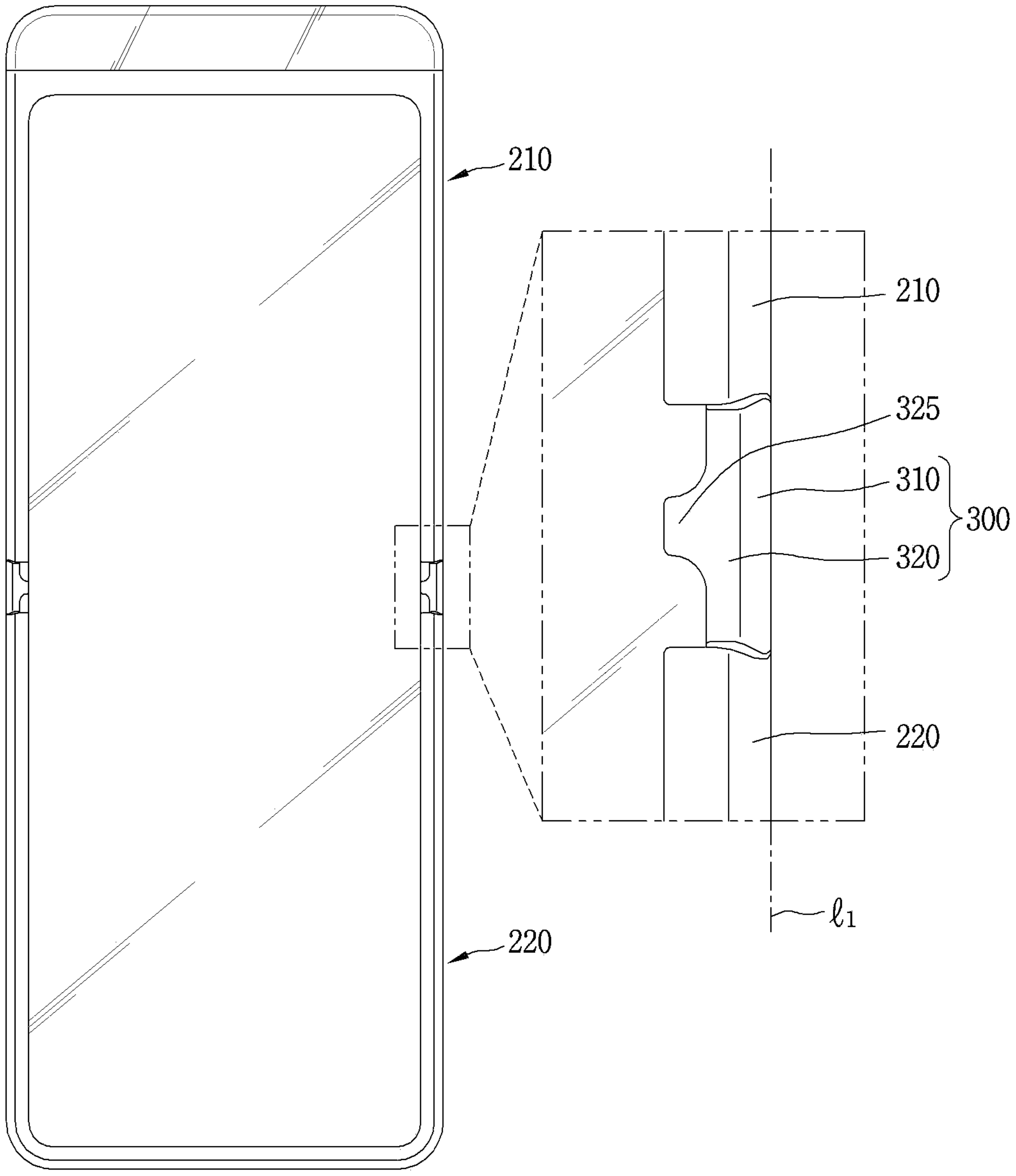

FIG. 1 is a block diagram of a mobile terminal 100 according to one embodiment of the present disclosure. FIG. 3 is a diagram illustrating a mobile terminal in accordance with an embodiment of the present disclosure.

The mobile terminal 100 may be shown having components such as a wireless communication unit 110, an audio/video (NV) input unit 120, a user input unit 123, a sensing unit 140, an output unit 150, a memory 170, an interface unit 160, a controller 180, and a power supply unit 190. Those components illustrated in FIG. 1 are not essential, and thus fewer or greater components may implement the mobile terminal 100.

The wireless communication unit 110 may include one or more modules for enabling wireless communication between the mobile terminal 100 and a wireless communication system or between the mobile terminal 100 and a network in which the mobile terminal 100 is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server through a broadcast channel.

The broadcast channel may include a satellite channel, a terrestrial channel, or both. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

Examples of the broadcast associated information may include information related to a broadcast channel, a broadcast program, a broadcast service provider, or the like. The broadcast associated information may be provided via a mobile communication network. In this case, the broadcast associated information may be received by the mobile communication module 112.

The broadcast associated information may be provided in various forms. The broadcast associated information may be implemented in various formats. For instance, such formats of the broadcast associated information may include Electronic Program Guide (EPG) of Digital Multimedia Broadcasting (DMB), Electronic Service Guide (ESG) of Digital Video Broadcast-Handheld (DVB-H), and the like.

For example, the broadcast receiving module 111 may receive a digital broadcast signal using a digital broadcast system, such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. Of course, the broadcast receiving module 111 may be adapted to other broadcasting systems as well as the digital broadcasting system described above.

The broadcast signal and/or the broadcast related information received through the broadcast receiving module 111 may be stored in the memory 170.

The mobile communication module 112 may transmit and receive wireless signals to/from at least one of a base station 10, an external terminal and a server over a mobile communication network. The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. Examples of such wireless Internet access include Wireless LAN (WLAN), Wireless broadband (Wibro), World Interoperability for Microwave Access (Wimax), High Speed Downlink Packet Access (HSDPA) and the like.

The short-range communication module 114 is a module for short-range communication. Suitable technologies for implementing such short-range communications include BLUETOOTH™, Radio Frequency IDentification (RFID), Infrared Data Association (IrDA), Ultra-WideBand (UWB), ZigBee, and the like.

The location information module 115 is a module for acquiring the position of the mobile terminal 100, and a representative example thereof is a Global Position System (GPS) module.

Figure 2:
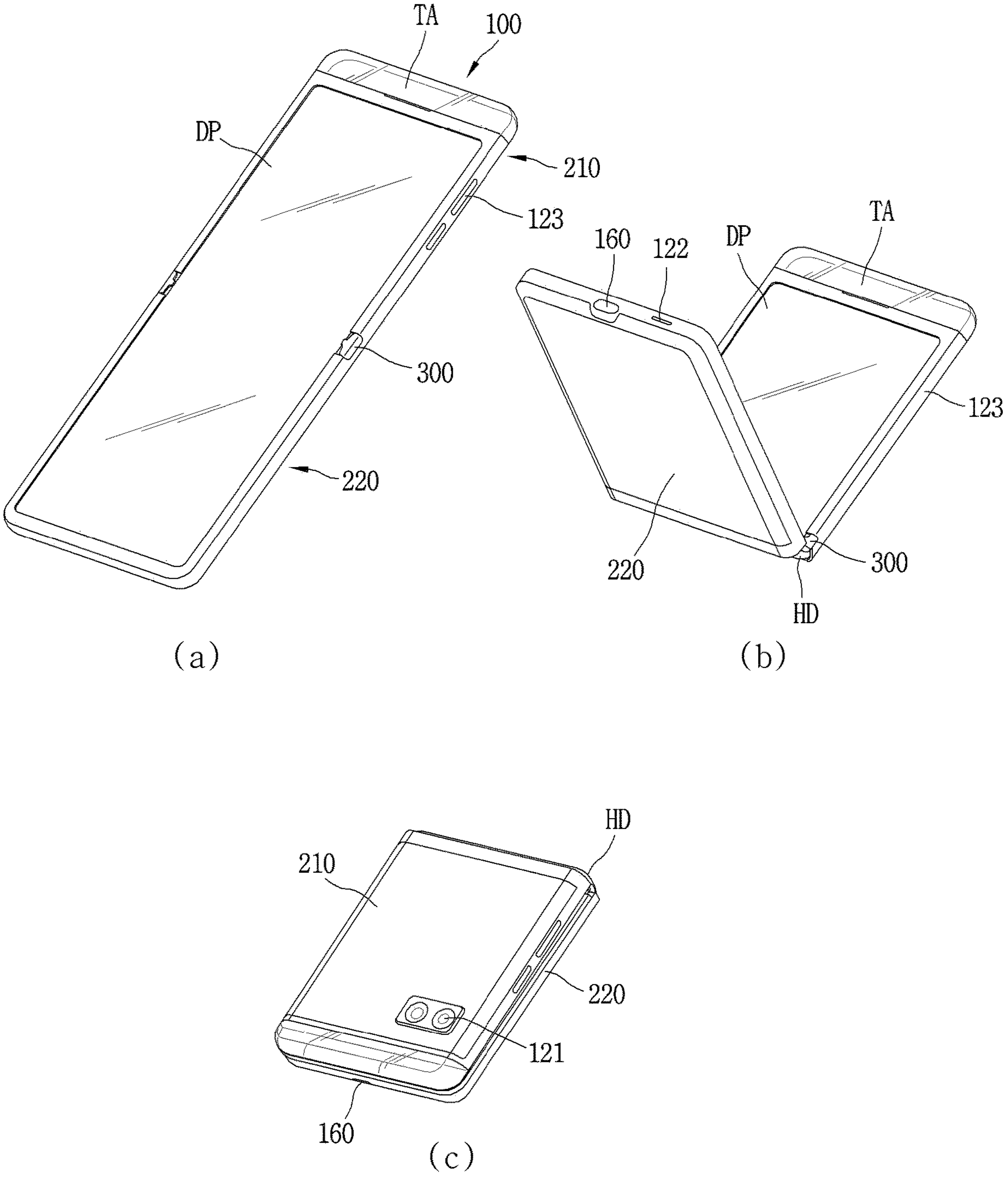
FIGS. 2 and 3 are diagrams illustrating a mobile terminal in accordance with one embodiment of the present disclosure.

FIG. 1 Referring to FIGS. 1 and 2, an A/V input unit 120 is for inputting an audio signal or a video signal, and may include a camera 121 and a microphone 122. Such cameras 121 may process image frames of still pictures or video obtained by image sensors in a video or image capture mode. The processed image frame may be displayed on the display unit 151.

The image frame processed by the camera 121 may be stored in the memory 170 or transmitted to the outside through the wireless communication unit 110. At least two cameras 121 may be provided depending on use environments. Specifically, referring to (c) of FIG. 2, the camera 121 may be disposed in an area exposed to an outside of a first body 210.

The microphone 122 receives an external sound signal and processes the external sound signal into electric audio data in a communication mode, a recording mode, a voice recognition mode, or the like. The processed audio data may be output by being converted into a format that can be transmitted to a mobile communication base station through the mobile communication module 112 in a call communication mode. If desired, the microphone 122 may include assorted noise removing algorithms to remove unwanted noise generated in the course of receiving the external audio signal.

The user input unit 123 generates input data for a user to control the operation of the terminal. The user input unit 123 may include a key pad, a dome switch, a touch pad (static/capacitance), a jog wheel, a jog switch, and the like. Specifically, as illustrated in (a) of FIG. 2, it may be configured as a key button.

The sensing unit 140 senses a current state of the mobile terminal 100, such as a position of the mobile terminal 100, presence of the user's contact, an orientation of the mobile terminal 100, acceleration/deceleration of the mobile terminal 100, and the like, and generates a sensing signal for controlling the operation of the mobile terminal 100. The sensing unit 140 may also sense whether an external device is coupled to the mobile terminal 100, or the like.

In addition, the sensing unit 140 may further include a proximity sensor 141, an illumination sensor 142, an acceleration sensor 143, and a gyro sensor 144.

The output unit 150 is configured to generate visual, audible or tactile output, and may be shown having a display unit 151, an audio output module 152, an alarm unit 153, a haptic module 154, and the like.

The display unit 151 may display (output) information processed in the mobile terminal 100. For example, when the mobile terminal 100 is in the call mode, the display unit 151 outputs a UI (User Interface) or GUI (Graphic User Interface) related to the call. When the mobile terminal 100 is in a video call mode or a capture mode, the display unit 151 outputs a captured and/or received image, UI, and GUI.

The display unit 151 may include at least one of a liquid crystal display (LCD), a thin film transistor-LCD (TFT LCD), an organic light-emitting diode (OLED), a flexible display, and a three-dimensional (3D) display.

Some of these displays may be transparent or light-transmissive so that external environments are visible therethrough. This may be referred to as a transparent display, and a typical example of the transparent display is TOLED (Transparent OLED) and the like. A rear structure of the display unit 151 may also be configured as a light transmissive type. With this structure, the user can see an object located behind the terminal body through an area occupied by the display unit 151 of the terminal body.

The display unit 151 may be provided by two or more according to the configuration type of the mobile terminal 100. For instance, the mobile terminal 100 may be provided with a plurality of display modules disposed on one surface in a spaced or integrated manner, or on different surfaces from each other.

When the display unit 151 and a sensor sensitive to a touch (hereinafter, referred to as 'touch sensor') has an interlayered structure (hereinafter, referred to as 'touch screen'), the display unit 151 may also be used as an input device as well as an output device. The touch sensor may have a form of, for example, a touch film, a touch sheet, a touch pad, or the like.

The touch sensor may be configured to convert changes of pressure applied to a specific part of the display unit 151, or capacitance occurring at a specific part of the display unit 151 into electric input signals. The touch sensor may be configured to detect not only position and area to be touched but also pressure at the time of touch.

When a touch input is sensed by a touch sensor, a signal(s) corresponding to the touch input is transmitted to a touch controller. The touch controller may process the received signals, and then transmit corresponding data to the controller 180. Accordingly, the controller 180 may sense which area of the display unit 151 has been touched.

Referring to FIG. 1, a proximity sensor 141 may be disposed in an inner area of the mobile terminal 100 surrounded by the touch screen or in the vicinity of the touch screen. The proximity sensor refers to a sensor to sense presence or absence of an object approaching a surface or an object located near a surface, by using an electromagnetic field, infrared rays, or the like without a mechanical contact. The proximity sensor 141 may have a longer lifespan and a more enhanced utility than a contact sensor The proximity sensor for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, proximity of a pointer to the touch screen may be sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position will correspond to a position where the pointer faces perpendicular to the touch screen upon the proximity touch of the pointer.

The proximity sensor may sense proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 170 in a call signal reception mode, a call mode, a record mode, a voice recognition mode, a broadcast reception mode, and the like. The audio output module 152 also provides audible output signals related to a particular function (e.g., a call signal reception sound, a message reception sound, etc.) performed by the mobile terminal 100. The audio output module 152 may also be implemented as a receiver, a speaker, a buzzer, or the like.

The alarm unit 153 may output a signal for informing about an occurrence of an event of the mobile terminal 100. Examples of events generated in the mobile terminal 100 include call signal reception, message reception, key signal input, touch input, and the like. The alarm unit 153 may also output a signal for informing occurrence of an event in a form, for example, vibration, other than a video signal or an audio signal. The video signal or the audio signal may be output through the display unit 151 or the audio output module 152 and thus they may also be classified as a part of the alarm unit 153.

The haptic module 154 generates various tactile effects that a user feels, perceives, or otherwise experiences. A typical example of a tactile effect generated by the haptic module 154 is vibration. Intensity and pattern of vibration generated by the haptic module 154 are controllable. For example, different types of vibration may be output in a combining manner or a sequential manner.

Besides vibration, the haptic module 154 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 154 can also be implemented to allow the user to feel a tactile effect through a muscle sensation such as the user's fingers or arm, as well as transferring the tactile effect through direct contact. Two or more haptic modules 154 may be provided according to the particular configuration of the mobile terminal 100.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. The mobile terminal 100 may also be operated in relation to a network storage device that performs the storage function of the memory 170 over a network, such as the Internet.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device.

For example, as illustrated in (c) of FIG. 2, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, a device having the identification module (hereinafter, an "identification device") may be fabricated in the form of a smart card. Accordingly, the identifying device may be connected with the terminal 100 via the port.

When the mobile terminal 100 is connected with an external cradle, the interface unit 170 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 may typically control the general operations of the mobile terminal 100. For example, the controller 180 may perform controlling and processing associated with voice calls, data communications, video calls, and the like. The controller 180 may include a multimedia module 181 for playing back multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images, respectively.

The power supply unit 190 may receive external power or internal power and supply appropriate power required for operating respective elements and components under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 4:
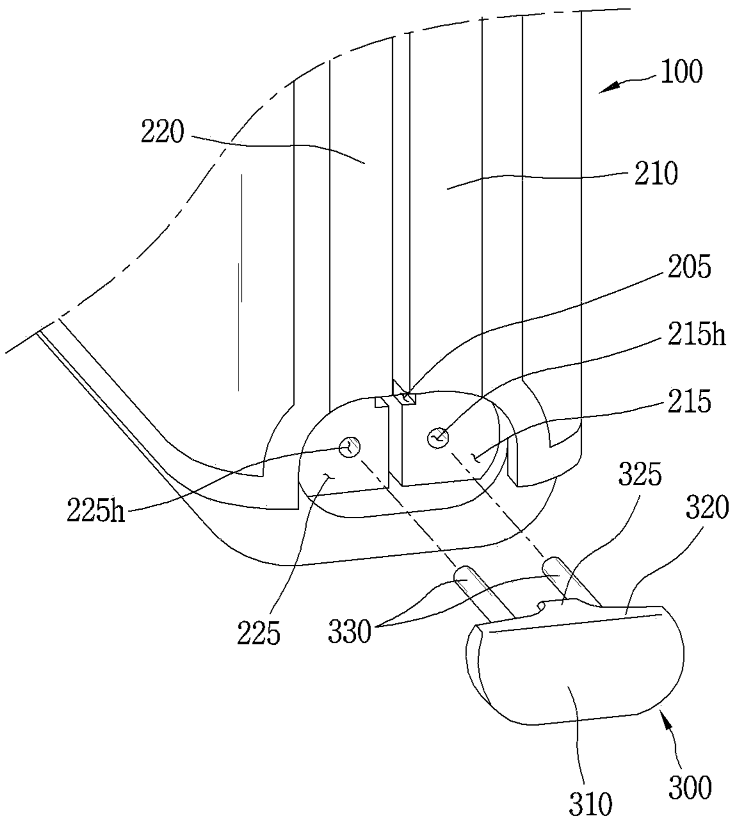
FIG. 4 is a diagram illustrating that a side decoration is inserted into the mobile terminal illustrated in FIG. 3.

FIGS. 2 and 3 are diagrams illustrating a mobile terminal in accordance with one embodiment of the present disclosure. FIG. 4 is a diagram illustrating that a side decoration is inserted into the mobile terminal illustrated in FIG. 3.

The mobile terminal 100 according to one embodiment of the present disclosure includes a first body 210, a second body 220, a flexible display (display panel (DP)), and a side decoration 300.

According to one embodiment disclosed herein, the mobile terminal 100 may include a first body 210 and a second body 220 that are rotatable relative to each other. That is, the mobile terminal 100 may be configured as a flexible display (DP) and a foldable mobile terminal 100. At this time, the mobile terminal 100 may implement a first state in which the first body 210 and the second body 220 are disposed side by side and a second state in which the first body 210 and the second body 220 are disposed to face each other.

Specifically, (a) of FIG. 2 illustrates a first state in which the first body 210 and the second body 220 are disposed side by side, that is, an unfolded state. (c) of FIG. 2 illustrates a second state in which the first body 210 and the second body 220 are disposed to face each other, that is, a folded state. (b) of FIG. 2 is a transition state in which the first body 210 and the second body 220 are switched from the first state to the second state.

Referring to FIG. 2, when the mobile terminal 100 is in the first state, a transparent area TA may be disposed on a front surface. The transparent area TA is a portion visible from the outside even in the second state, and a lower area of the flexible display DP corresponding to the transparent area TA may be visible from the outside in the second state.

The flexible display DP integrally formed with the first body 210 and the second body 220 may be disposed on the first body 210 and the second body 220. In other words, the flexible display DP may continuously be disposed on the first body 210 and the second body 220.

In addition, the side decoration 300 may be disposed between the first body 210 and the second body 220 to fill a space between the first body 210 and the second body 220 in the first state.

A hinge decoration (HD) to be described later may be disposed at a rear surface of the side decoration 300. The hinge decoration HD serves to shield a space that is defined between the first body 210 and the second body 220 as the first body 210 and the second body 220 are switched from the first state to the second state. A hinge assembly (HA) to be described later may be disposed at an inner side of the hinge decoration HD.

As illustrated in FIGS. 2 and 3, the side decoration 300 may be disposed between the first body 210 and the second body 220. At least a portion of the side decoration 300 covers the flexible display DP.

Figure 8:
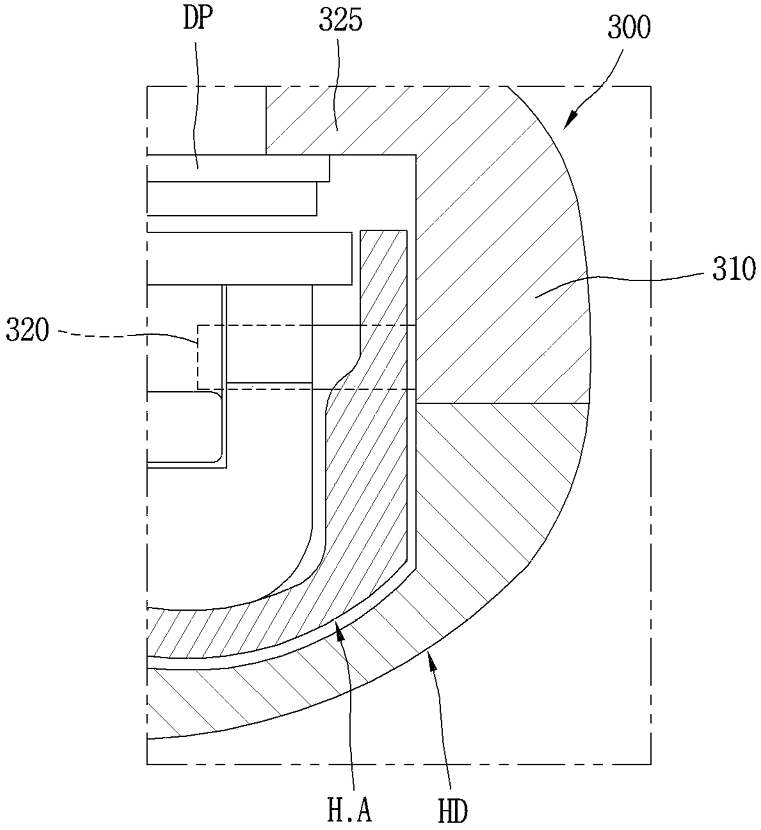

Specifically, referring to FIGS. 2 and 8, a protrusion 325 of the side decoration 300 covers (overlaps) at least a portion of the flexible display DP. That is, the protrusion 325 of the side decoration 300 may overlap at least a portion of the flexible display DP in the first state.

A side surface of the side decoration 300 is formed on the same line as outer side surfaces of the first body 210 and the second body 220. Specifically, as illustrated in FIG. 3, the side surface of the side decoration 300 and the outer side surfaces of the first body 210 and the second body 220 are aligned on the same line 11.

This may suppress a protrusion of or a generation of a concave gap in a side surface defined by the first body 210, the side decoration 300, and the second body 220. That is, since the outer surface of the mobile terminal 100 is formed in a straight line (seamlessly, integrally), an outer line of the mobile terminal 100 may be simplified. In addition, the side decoration 300 may define appearance of one side of the mobile terminal 100.

Referring to FIG. 4, the side decoration 300 may include a side part 310 defining a portion of a side surface together with the first body 210 and the second body 220, and a protrusion 325 protruding from an upper end of the side part 310 toward the flexible display DP.

As described above, the side part 310 may define appearance of a portion of the side surface of the mobile terminal 100. Specifically, the side part 310 may define partial appearance of the mobile terminal 100 between the first body 210 and the second body 220. The side part 310 may be visible from the side surface of the mobile terminal 100 in both the first state and the second state.

An upper part 320 is a surface disposed on an upper side of the side part 310. The upper part 320 is a portion visible from a front surface of the mobile terminal 100, together with the flexible display DP, in the first state. The upper part 320 may include the protrusion 325 protruding toward the flexible display DP.

The protrusion 325 may protrude from the upper end of the side part 310 toward the flexible display DP. The protrusion 325 may have a shape protruding toward the flexible display DP from a central portion of the side part 310. Specifically, as illustrated in FIGS. 4 and 8, the protrusion 325 may protrude toward the flexible display DP and overlap the flexible display DP in the first state. In addition, the first body 210 and the second body 220 may have a groove 205 into which the protrusion 325 is inserted.

On the other hand, a first concave groove 215 and a second concave groove 225 into which the side part 310 of the side decoration 300 is inserted are formed in the first body 210 and the second body 220, respectively.

Specifically, as illustrated in FIG. 4, the first body 210 and the second body 220 may be provided with the first concave groove 215 and the first concave groove 215 into which the side part 310 of the side decoration 300 is inserted. The first concave groove 215 and the second concave groove 225 are formed to be concave inwardly in the first body 210 and the second body 220, respectively, and are portions which are different in shape from the existing first body 210 and second body 220. This is to make the side decoration 300 visible from the outside in both the first state and the second state, and to define appearance of one side of the mobile terminal 100.

The side decoration 300 may further include coupling protrusions 330 protruding toward the first body 210 and the second body 220 from the inside of the side part 310.

Specifically, as illustrated in FIG. 4, the side decoration 300 may further include coupling protrusions 330 protruding toward the first body 210 and the second body 220 from a lower portion of the side part 310. The coupling protrusions 330 protrude to couple the side decoration 300 to the first body 210 and the second body 220, respectively.

In addition, the first body 210 and the second body 220 may include coupling grooves **215*h* and 225*h*, respectively, formed concavely so that the coupling protrusions 330 are inserted. The coupling protrusions 330 may be coupled to the coupling grooves 215*h* and 225*h* of the first body 210 and the second body 220, respectively, so that the side decoration 300 is coupled to the first body 210 and the second body 220**.

The side decoration 300 may be formed to be inserted into the first body 210 and the second body 220 in the second state. Specifically, referring to FIG. 4, the side decoration 300 may be formed to be inserted into the first body 210 and the second body 220 in the second state.

The second state may be a state in which a gap is defined between the protrusion 325 of the side decoration 300 and the flexible display DP. Specifically, referring to (a) of FIG. 6, the protrusion 325 of the side decoration 300 and the flexible display DP may have a predetermined distance therebetween. This can suppress an occurrence of damage to the flexible display DP that may occur during the process of inserting the side decoration 300 into the first body 210 and the second body 220 in the second state.

In the mobile terminal 100 according to one embodiment of the present disclosure, the side decoration 300 can be inserted into the side surfaces of the first body 210 and the second body 220. Accordingly, interference with the flexible display DP can be minimized in the process of assembling the side decoration 300. This can minimize damage to the flexible display DP during the process of assembling the side decoration 300.

Figure 5:
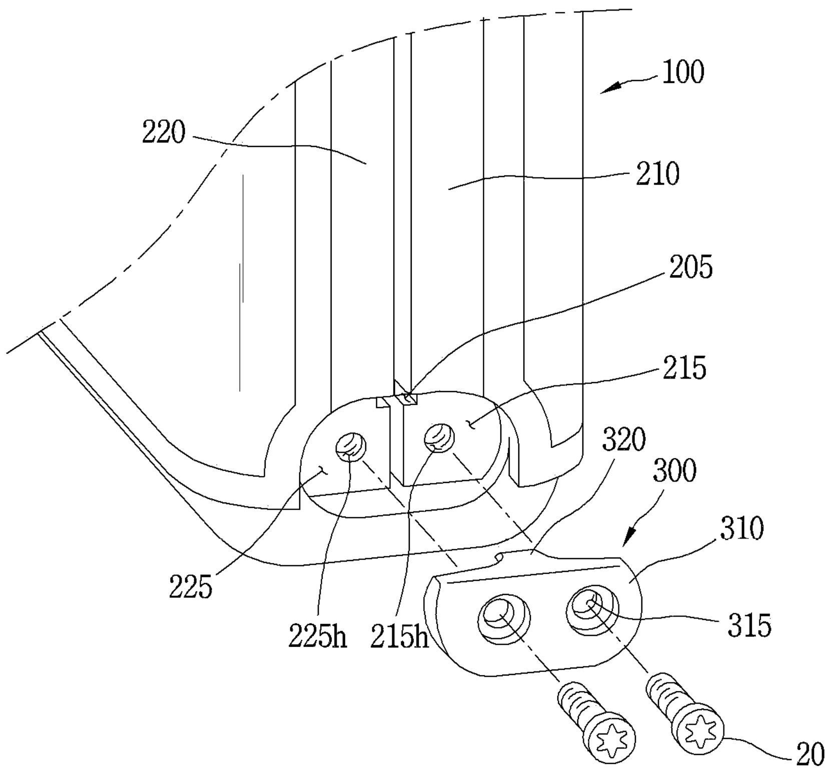
FIG. 5 is a diagram illustrating that a side decoration is inserted into a mobile terminal in accordance with one embodiment of the present disclosure.

FIG. 5 is a diagram illustrating that a side decoration 300 is inserted into a mobile terminal 100 in accordance with one embodiment of the present disclosure. Compared to the mobile terminal 100 illustrated in FIGS. 2 to 4, this mobile terminal 100 according to one embodiment of the present disclosure has the same/like components except for fastening holes 315 formed in the side part 310 of the side decoration 300. Thus, the description thereof will be omitted.

In the mobile terminal 100 according to one embodiment of the present disclosure, fastening holes 315 may be formed in the side part 310 of the side decoration 300.

Specifically, fastening holes 315 into which coupling members 20 may be inserted may be formed in the side part 310 of the side decoration 300. The coupling members 20 are inserted into the fastening holes 315. In addition, the first body 210 and the second body 220 may include coupling grooves 215*h* and 225*h*, respectively, into which the coupling members 20 may be inserted.

The coupling member 20 inserted into the fastening hole 315 may have a bolt-like shape. Accordingly, the side decoration 300 may be rotated to be assembled to the first body 210 and the second body 220 by means of threads formed inside the fastening holes 315 and inside the coupling grooves 215*h* and 225*h*.

In the mobile terminal 100 according to one embodiment of the present disclosure, coupling rigidity between the first body 210 and the second body 220 and the side decoration 300 can be increased by the side decoration 300 and the coupling members 20. Specifically, since the first body 210, the second body 220, and the coupling members 20 may be integrally coupled by use of the coupling members 20, distortion due to external impact may be reduced.

In addition, in the related art, when the mobile terminal 100 is dropped laterally, deformation between the first and second bodies 210 and 220 and the side decoration 300 may occur. However, since the side decoration 300 defines the partial appearance of the side surface of the mobile terminal 100, an external impact that may be applied to the mobile terminal 100 when the mobile terminal 100 is dropped can be absorbed by the side decoration 300, thereby reducing the fear of deformation.

In addition, according to an embodiment of the present disclosure, since the side decoration 300 is coupled to the first body 210 and the second body 220, the need to secure rigidity due to drop impact may be decreased, thereby reducing a size of a bezel.

In addition, the mobile terminal 100 according to one embodiment of the present disclosure may be coupled to a hinge decoration by screws (coupling members 20) in a lateral direction. Therefore, there is an advantage in that distortion of an outer case including the first body 210 and the second body 220 in three axial (X-axial, Y-axial, and Z-axial) directions due to an external impact can be reduced.

Figure 6:
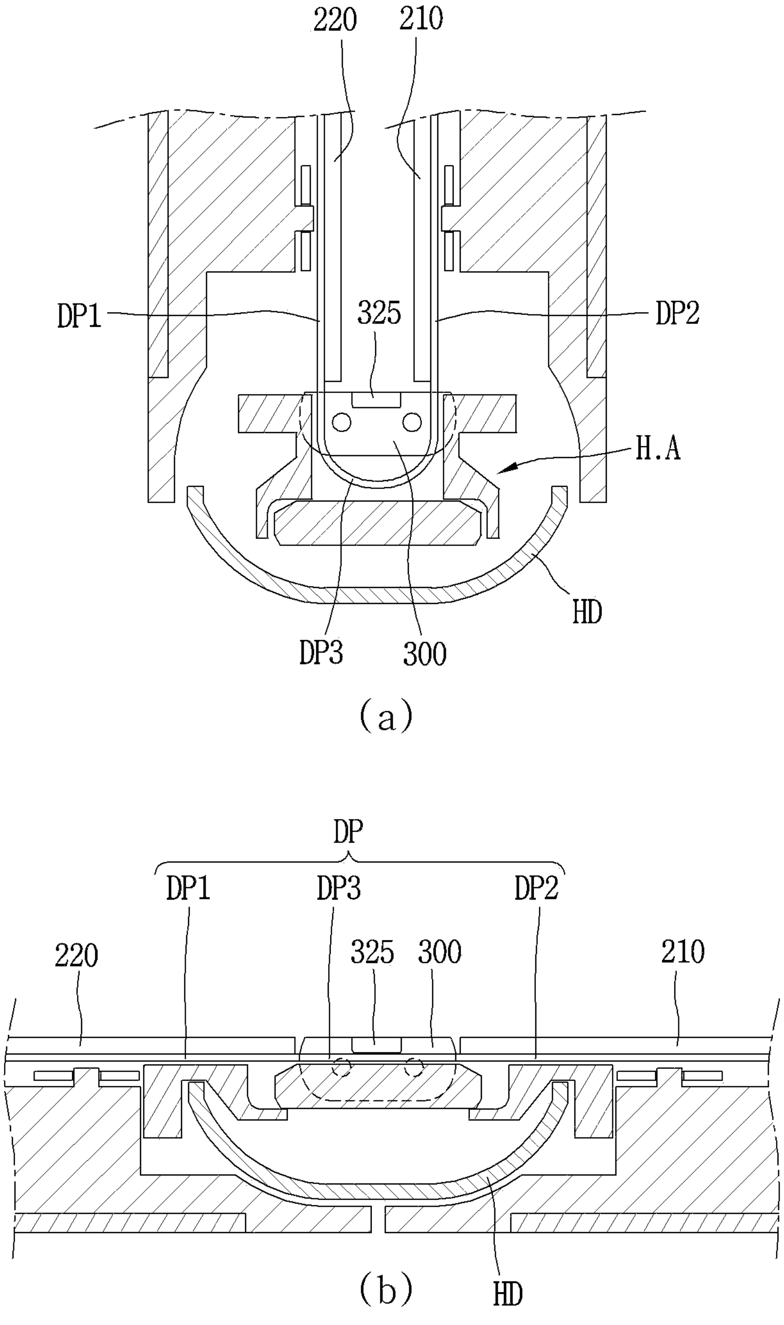
FIG. 6 is a conceptual diagram illustrating a first state and a second state of a mobile terminal in accordance with one embodiment of the present disclosure.

FIG. 6 is a conceptual diagram illustrating a first state and a second state of a mobile terminal 100 in accordance with one embodiment of the present disclosure.

In the mobile terminal 100 according to one embodiment of the present disclosure, the protrusion 325 may be disposed to overlap one area of the flexible display DP in the first state, and to be spaced apart from the flexible display DP in the second state.

(a) of FIG. 6 illustrates the second state in which the first body 210 and the second body 220 are disposed to face each other, and (b) of FIG. 6 illustrates the first state in which the first body 210 and the second body 220 are disposed side by side.

Referring to (b) of FIG. 6, the protrusion 325 of the side decoration 300 may be disposed to overlap (cover) at least a portion of an upper end of the flexible display DP.

In addition, when switched from (b) of FIG. 6 to (a) of FIG. 6, namely, when the first state is switched to the second state, the position of the side decoration 300 does not change, but the flexible display DP is folded on both sides. During this, the portion of the flexible display DP that is covered by the side decoration 300 may move downward.

The flexible display DP may be divided into three areas. That is, the flexible display DP may be divided into a first area disposed on the first body 210, a third area disposed on the second body 220, and a second area disposed on the side decoration 300.

In the first state, the first area, the second area, and the third area of the flexible display DP are disposed parallel to each other. In addition, when the mobile terminal 100 is switched to the second state, the first area and the third area may be rotated to face each other and the second area may move downward.

On the other hand, in the first state, top surfaces of the first body 210 and the second body 220 and a top surface of the side decoration 300 may be flush with each other.

Specifically, referring to (b) of FIG. 6, the top surfaces of the first body 210 and the second body 220 and the top surface of the side decoration 300 may have the same height. Since the side part 310 of the mobile terminal 100 has the same height in the first state, natural appearance can be achieved in the first state without a step or the like with respect to the side part 310 of the mobile terminal 100.

Figure 7:
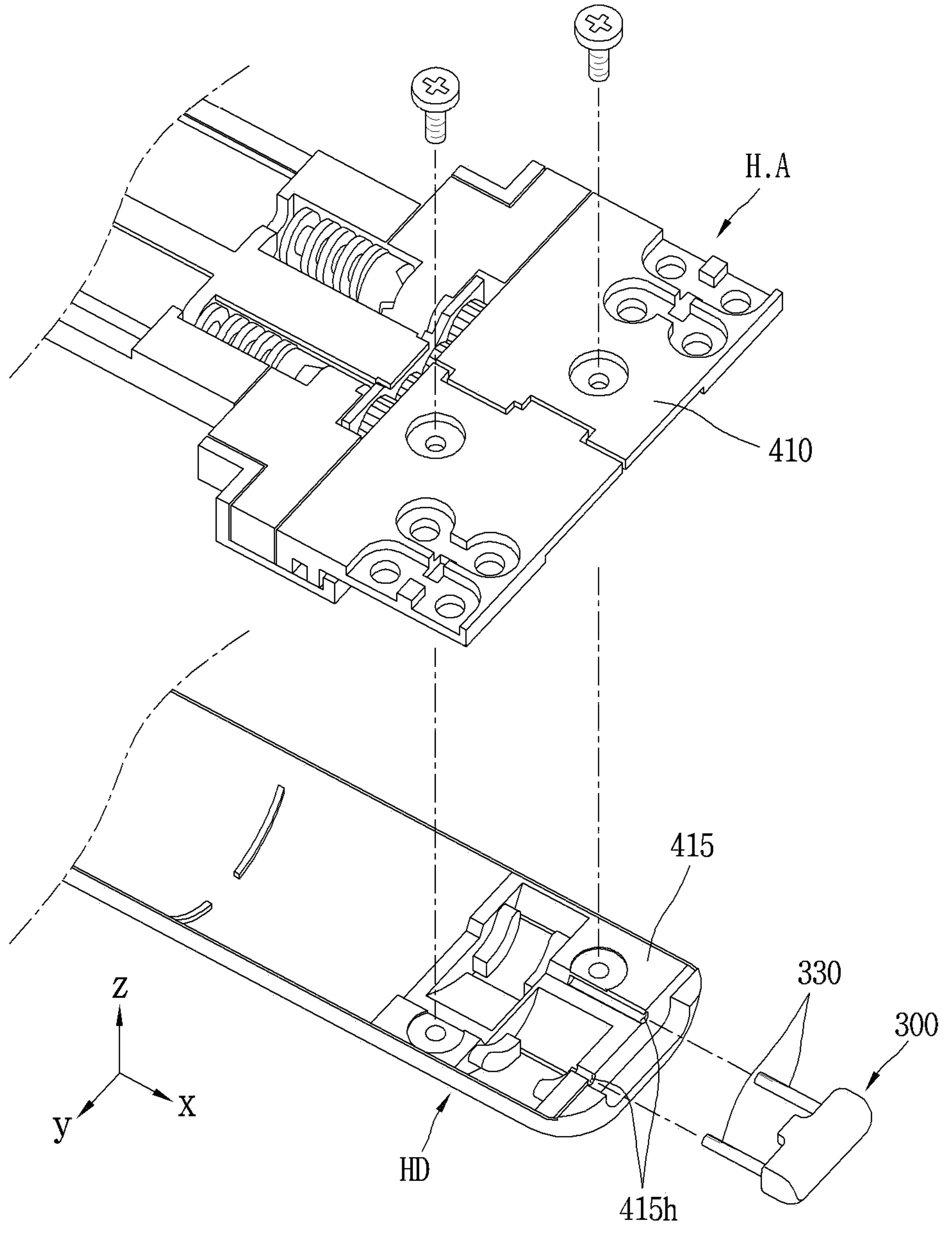
FIGS. 7 and 8 are conceptual diagrams illustrating that a side decoration is inserted into a hinge decoration of a mobile terminal in accordance with one embodiment of the present disclosure.

FIGS. 7 and 8 are conceptual diagrams illustrating that a side decoration 300 is inserted into a hinge decoration of a mobile terminal 100 in accordance with one embodiment of the present disclosure.

The mobile terminal 100 according to one embodiment of the present disclosure may further include a hinge assembly HA that is connected to the first body 210 and the second body 220, and allows the first body 210 and the second body 220 to be switched to the first state and the second state.

As illustrated in FIG. 7, the hinge assembly HA may be connected to the first body 210 and the second body 220 to switch the first body 210 and the second body 220 to the first state and the second state. Specifically, a pair of body rotation bodies 410 of the hinge assembly HA may be coupled to the first body 210 and the second body 220, respectively.

The hinge assembly HA may further include a hinge decoration that is obscured by the first body 210 and the second body 220 in the first state and visible to the outside in the second state. The hinge decoration may be disposed on a rear surface of the hinge assembly HA.

Specifically, referring to (b) of FIG. 6, the hinge decoration may be covered by the first body 210 and the second body 220 in the first state to be invisible from the outside. And, referring to (a) of FIG. 6, as the first body 210 and the second body 220 rotate to face each other in the second state, the hinge decoration may be disposed to be visible from the outside.

Meanwhile, the protrusion 325 of the side decoration 300 may be inserted into the hinge decoration.

Specifically, referring to FIG. 7, the hinge decoration may include a slot guide 415 for guiding the body rotation bodies 410 in the process of rotating the body rotation bodies 410 to the first state and the second state. Specifically, slots may protrude from rear surfaces of the body rotation bodies 410 to assist rotation of the body rotation bodies 410. The slots protruding from the body rotation bodies 410 may be guided and rotated along the slot guide 415.

Meanwhile, referring to FIG. 7, the slot guide 415 may be provided with slot guide grooves 415*h* into which the coupling protrusion 330 of the side decoration 300 may be inserted. Accordingly, the coupling protrusions 330 of the side decoration 300 may be inserted into the slot guide grooves 415*h*, so that the hinge decoration and the side decoration 300 can be coupled to each other.

Furthermore, in the mobile terminal 100 according to one embodiment of the present disclosure, when the side decoration 300 is assembled with the hinge decoration, the coupling protrusions 330 of the side decoration 300 may be fitted to the slot guide 415 of the rotating bodies 410, thereby reinforcing rigidity of the slot guide 415 itself. Accordingly, there is an effect of reducing movement that may occur in the slot guide 415 when the first body 210 and the second body 220 are switched to the first state and the second state.

Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A flexible display device comprising:

a first body;

a second body configured to be rotatable relative to the first body;

a hinge assembly connected to the first body and the second body;

a flexible display continuously disposed on the first body and the second body; and a side decoration disposed between the first body and the second body, and at least a portion overlapping the flexible display, wherein the first body and the second body are switched into a first state to be disposed side by side and a second state to face each other, wherein the hinge assembly is configured to switch the first body and the second body into the first state and the second state, and a side surface of the side decoration is formed on the same line as outer side surfaces of the first body and the second body, wherein the side decoration includes:

a side part defining a portion of a side surface, together with the first body and the second body; and a protrusion connected to the hinge assembly and protruding from an upper end of the side part toward the flexible display in a direction away from a plane of the side surface, and wherein the protrusion is disposed to overlap a portion of an upper end of the flexible display in the first state, and disposed to be spaced apart from the flexible display in the second state.

2. The flexible display device of claim 1, wherein the first body and the second body include a first concave groove and a second concave groove, respectively, into which the side part of the side decoration is inserted.

3. The flexible display device of claim 1, wherein the side decoration further includes coupling protrusions protruding toward the first body and the second body, respectively, from an inside of the side part to be coupled to the first body and the second body, the first body and the second body include coupling grooves, respectively, formed concavely so that the coupling protrusions are inserted therein.

4. The flexible display device of claim 1, wherein the side part of the side decoration includes fastening holes into which coupling members are inserted, and the first body and the second body include coupling grooves, respectively, into which the coupling members are inserted.

5. The flexible display device of claim 2, wherein the side decoration is inserted into the first body and the second body in the second state.

6. The flexible display device of claim 1, wherein top surfaces of the first body and the second body and a top surface of the side decoration have the same height.

7. The flexible display device of claim 1, wherein the hinge assembly includes a hinge decoration obscured by the first body and the second body in the first state and visible to outside in the second state, and the protrusion is inserted into the hinge decoration.

* * * * *